United States Patent [19]

Marx et al.

[11] 3,948,845

[45] Apr. 6, 1976

[54] OPALESCENT POLYMER COMPOSITIONS

[75] Inventors: John W. Marx, Leavenworth, Kans.; James N. Short, Bartlesville, Okla.

[73] Assignee: Phillips Petroleum Company, Bartlesville, Okla.

[22] Filed: Oct. 17, 1974

[21] Appl. No.: 515,605

Related U.S. Application Data

[63] Continuation of Ser. No. 263,998, June 19, 1972, abandoned.

[52] U.S. Cl. ...... 260/31.2 MR; 63/32; 260/31.8 DR; 260/33.2 R; 260/33.4 R; 260/33.6 A; 264/4
[51] Int. Cl.².... C08K 5/05; C08K 5/06; C08K 5/10
[58] Field of Search ..... 260/83.7, 33.6 A, 31.2 MR, 260/31.8 DR, 880 B, 33.2 R, 33.4 R

[56] References Cited
UNITED STATES PATENTS

| | | | |
|---|---|---|---|
| 2,526,654 | 10/1950 | Gleason | 260/84.3 |
| 2,611,719 | 9/1952 | Borders | 117/161 |
| 3,110,706 | 11/1963 | Vollmert | 260/83.7 |
| 3,330,785 | 7/1967 | Boyd | 260/83.7 |
| 3,449,469 | 6/1969 | Maringer | 260/876 |
| 3,622,551 | 11/1971 | Davis | 260/84.1 |
| 3,631,006 | 12/1971 | Hawkins | 260/83.7 |
| 3,649,584 | 3/1972 | Bailey | 260/31.2 MR |
| 3,728,300 | 4/1973 | Minekawa | 260/33.6 AQ |
| 3,753,936 | 8/1973 | Marrs | 260/33.2 |
| 3,772,238 | 11/1973 | Malone | 260/33.6 A |

*Primary Examiner*—Paul R. Michl

[57] ABSTRACT

Opalescent-appearing compositions are prepared by dispersing conjugated diene/vinyl aromatic compound copolymers in a suitable solvent. Encapsulated compositions of this invention display the colors and brilliance of precious opal.

17 Claims, No Drawings

OPALESCENT POLYMER COMPOSITIONS

This application is a continuation of our copending application Ser. No. 263,998, filed June 19, 1972, now abandoned.

FIELD OF THE INVENTION

The invention relates to opalescent-appearing compositions. In another aspect, the invention relates to methods to prepare opalescent-appearing compositions.

BACKGROUND OF THE INVENTION

New and useful compositions of matter are always desirable. When compositions can be produced readily, economically, and have both an aesthetic effect as well as a utilitarian value, such compositions are highly to be desired.

OBJECTS OF THE INVENTION

It is an object of the invention to prepare opalescent-appearing polymeric compositions.

Other aspects, objects, and several other advantages of the invention will be apparent to those skilled in the art or arts to which the invention most nearly appertains from the following description as well as from the appended claims.

BRIEF SUMMARY OF THE INVENTION

We have discovered that colored opalescent-appearing compositions can be prepared by dissolving a high molecular weight vinyl aromatic compound/conjugated diene copolymer in a suitable solvent-dispersant. The color varies from a faint at low copolymer concentration to and through a myriad of various beautiful colors to white at high copolymer concentrations. The presently preferred copolymer is a styrene/butadiene copolymer, and a presently preferred composition is about a 90/10 styrene/butadiene copolymer. The opalescent polymer-solvent composition can be encapsulated in transparent containers and sealed for use in various decorative effects, jewelry, reflective signal devices, and the like.

DETAILED DESCRIPTION OF THE INVENTION

COPOLYMERS

The copolymers for use within the context of our invention are copolymers of one or more monovinyl-substituted aromatic compounds with one or more copolymerizable conjugated dienes. The monovinyl-substituted aromatic compound should represent the major portion of the copolymer, and the conjugated diene the minor, preferably at least about 75 weight percent monovinyl-substituted aromatic compound in the copolymer with the conjugated diene component the remainder. Presently preferred are copolymers in which the monovinyl aromatic compound represents about 75 to 95 weight percent and the conjugated diene from 25 to 5 weight percent, presently most preferred being a weight ratio of about 90/10.

The copolymers employed in our invention can be random or block, with the latter presently being preferred. Since the relative proportion of copolymerized conjugated diene can be relatively low, there would, in some copolymers, obviously be relatively long sequences of combined vinyl aromatic units even in random copolymers. A presently preferred copolymer contains at least about 10 weight percent of combined vinyl aromatic as a single block, substantially free of combined conjugated diene monomer, at one end of the molecule.

Presently preferred are those copolymers having relatively high molecular weights of above about 500,000 even up to 1,000,000 and above, as determined by the amount of initiator employed in the polymerization. For a living polymerization system the molecular weight can be calculated from the equation: molecular weight = weight of monomer polymerized/moles of active initiator.

The monovinyl-substituted aromatic compounds useful within the context of our invention are those in which the vinyl group is attached to a nuclear carbon atom and include styrene and alkyl-substituted styrene in which the alkyl groups are attached to nuclear carbon atoms. The alkyl groups can each contain from 1 to 4 carbon atoms, with the total carbon atoms in such groups not exceeding 4. Examples include 4-methylstyrene, 3-ethylstyrene, 3,5-dimethylstyrene, 3,4-diethylstyrene, 4-tert-butylstyrene, 4-isopropylstyrene, and the like, containing 8 to 20, preferably 12 carbon atoms per molecule.

The conjugated dienes useful within the context of our invention are any polymerizable conjugated diene copolymerizable with monovinyl-substituted aromatic compounds, those hydrocarbon conjugated dienes containing from 4 to 10, preferably 4 to 6, carbon atoms per molecule presently preferred. Examples of such monomers include 1,3-butadiene, isoprene, piperylene, 2-ethyl-1,3-butadiene, 1,3-hexadiene, and the like, presently preferred being butadiene.

A wide variety of initiators are useful in preparing the described polymers, including the various organoalkali metal initiators of broad description, such as the organolithium initiators. Initiators include lithium and metal organolithium initiators represented by $RLi_x$ wherein R is a hydrocarbon radical, having a valence equal to $x$, which can be aliphatic, cycloaliphatic, or aromatic and can have 1 to 20 carbon atoms per radical, and $x$ is an integer of from 1 to 4, such as methyllithium, n-butyllithium, cyclohexyllithium, 1,4-dilithiobutane, tetralithionaphthalene, and the like. These organolithium compounds as well as various lithium adducts with polyaryl hydrocarbons are known in the polymerization arts and it therefore is not necessary to describe them or their preparation in more detail. Presently preferred for preparation of copolymers that we have described are alkyllithium initiators such as n-butyllithium. The amount of initiator used depends on the desired molecular weight of the polymer, and can be adjusted by practitioners of the art accordingly. A suggested range is about 0.05 to 0.5 millimoles of organolithium as lithium per 100 grams of monomers employed.

All of the monomer charge can be added initially, or in increments, or one monomer can be added first and the other later, and the like. Polymerization can be conducted in the presence of a polymerization diluent for convenience, such as the hydrocarbons of 4 to 12 carbon atoms; butanes, pentanes, hexanes, cyclohexane, alkyl substituted cyclohexane, toluene, xylenes, and the like, alone, or in admixture.

Typical polymerization conditions include polymerization temperatures of about zero to 250°F., polymerization pressures such as to maintain the reactants and any solvent present substantially in the liquid phase, and polymerization times as convenient, such as from a few minutes to 48 hours or more.

After the desired degree of polymerization, one or more compounds which contain active hydrogen, such as water, methyl, ethyl, propyl or other alcohol, or an acid such as hydrochloric acid or fatty acid, are added to the polymerization reaction mixture so as to terminate the polymerization, and coagulate or precipitate the polymer. The polymer can be recovered by filtration, by flashing of solvent and unreacted monomer, or the like, as may be convenient. The polymer can be further purified if desired by washing, or by dissolving in a suitable solvent and again precipitating. Stabilizers such as antioxidants, ultraviolet stabilizers, and the like, can be added, if desired.

SOLVENT-DISPERSANT

For preparation of our opalescent compositions, the copolymers are dissolved or dispersed in one or more solvents or dispersants. The solvents may be employed either as single materials or monosolvents, or admixtures of two or more which we term polysolvents. Esters, ethers, or hydrocarbons, or mixtures, can be employed.

The high molecular weight copolymers and solvent-dispersant tend to form a gel-like solution. Concentrations of less than about 5 weight percent of copolymer demonstrate little or no color interplay. Concentrations over 25 percent, while opalescent, tend to become viscous and difficult to handle. Concentrations presently preferred are between about 5 and 20 weight percent, and presently most preferred between about 8 and 12 percent for best effects, weight of copolymer to total weight of copolymer and solvent mixture.

Both saturated as well as unsaturated solvent-dispersants can be employed, although where an unsaturated solvent is employed which might also be polymerizable, it is desirable to add a stabilizer to the composition in order to avoid slowly polymerizing the solvent with time which might undesirably affect the permanency of the opalescent color effects.

Suitable solvents include the liquid esters, with liquid being defined as the usual physical condition of the substance at normal conditions, i.e., standard temperature and pressure. The esters can be represented by the formula:

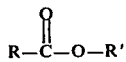

$$R-\overset{O}{\underset{\|}{C}}-O-R'$$

in which R is hydrogen or an alkyl, cycloalkyl, alkenyl, cycloalkenyl, araryl radical of up to 8 carbon atoms per radical and can contain noninterfering substituents such as halogens. The R' group can be any alkyl, cycloalkyl, or aryl radical containing up to 8 carbon atoms. The preferred esters should contain a minimum of at least 6 carbon atoms. R or R' can contain non-interfering substituents such as halogen.

Illustrative examples of suitable esters include 2-ethylhexyl acetate, ethyl benzoate, butyl acetate, butyl benzoate, ethyl methacrylate, cyclohexyl propionate, decyl formate, methyl hexanoate, isobutyl acrylate, or other liquid esters containing such groups as phenyl, cyclopentyl, cyclohexyl, tolyl, or similar groups, and the like. Presently preferred monosolvent esters include the acetates such as amyl acetate, hexyl acetate, heptyl acetate, octyl acetate, also methyl salicylate, and the methacrylates such as methyl methacrylate and hexyl methacrylate. A single ester can be employed, or admixtures of two or more esters, if desired.

Suitable hydrocarbons include aromatic hydrocarbons in general and which are liquid at room temperatures and pressures, i.e., standard temperatures and pressures, and preferably from 6 to 12 carbon atoms per molecule including benzene, toluene, xylenes, alkyl naphthalenes, or the like, including mixtures.

Mono- and dialkyl ethers of dipropylene or diethylene glycol, sometimes called Carbitols can also be used. These include diethylene glycol monobutyl ether, diethylene glycol dipropyl ether, diethylene glycol monoethyl ether, diethylene glycol monoamyl ether, diethylene glycol dibutyl ether, diethylene glycol diethyl ether, diethylene glycol monohexyl ether, diethylene glycol monomethyl ether, and the like or mixtures. High molecular weight alcohols such as α-terpineol also may be effectively employed. In general, these solvents can range from about 5 to 16 carbon atoms per molecule. Presently preferred dispersant species include the dialkylcarbitols, particularly diethylene glycol dibutyl ether, for particularly pleasing effects in our opalescent compositions, and minimal effects of temperature. Any one or more of the esters as described can be employed in a polysolvent system along with one or more ethers or hydrocarbons.

The solvent-dispersants can be employed alone as monosolvents, or as polysolvents in any broad ratio or proportion in admixture, such as a ratio of 1:1 to 99:1. Various combinations of ester/hydrocarbon, ester/alcohol, hydrocarbon, hydrocarbon, can be employed. Ter-systems can be employed utilizing one or more solvent-dispersants from any or even all of the groups. Presently preferred polysolvents include dibutyl phthalate/α-terpineol, cyclohexane/toluene, amyl acetate/xylene.

Any desired suitable light filter or ultraviolet light or oxidative stabilizer may be employed, where desired, to stabilize unsaturated solvents, cosolvents, or the like, or to stabilize the polymers themselves, where necessary, against slow undesirable oxidative degradation or change, depending on whether the opalescent composition is to be exposed to air, or the like, for extended intervals.

CARBON BLACK

An aspect of our invention lies in the optional incorporation of minor amounts of carbon black into the copolymer-dispersant opalescent-appearing compositions. Such addition tends to enhance the coloring and opalescent effects of the compositions. It would appear that the carbon black acts, although we do not wish to be bound by theorizing, as a black background to the color and opalescent effects, thus enhancing the pleasing appearance to the eye.

The carbon black is employed in the copolymer-solvent admixture in a minor effective amount sufficient to provide the enhancing effect desired. The amount used may be influenced by such factors as particular solvent, polymer concentration, color of polymer background if any where encapsulation is to be employed, physical depth of the opalescent admixture to be observed, and the like. A range of about 0.01 or less to 0.5 or more, preferably 0.01 to 0.1, weight percent of carbon black relative to the total admixture of polymer and solvent presently appears to be a satisfactory range for most purposes. It is to be noted that there is a general tendency for very small opalescent encapsulations to require somewhat higher amounts of the carbon black for more striking effects. The carbon black can be dispersed in the solvent before adding the copolymer, or can be dispersed in the copolymer-solvent system itself. Any suitable finely divided carbon black can be employed. The type of carbon black employed preferably is a finely divided, pigment type of black, such as channel black, fine furnace black, ink black, or the like.

METHOD OF ADMIXING

The copolymer, the solvent-dispersant, and optionally, the carbon black, further optionally one more with any stabilizers desired can be admixed together by any convenient method for admixing such materials, adding the materials together or in any order found convenient. The particular sequence of addition does not appear to be critical. Suitable stirring devices, blending devices, and the like, can be utilized.

The temperature of admixing should not be excessively high, merely sufficient to provide convenient handling of the components and sufficient rate of dissolution of polymer in the solvent-dispersant system to avoid prolonged inconvenient manipulation. Of course, the physical particle size of the polymer component has much to do with rate of dissolution as well as the temperature of admixing. Presently preferred are admixing temperatures below about 200° F., and presently more preferred are admixing temperatures of about 0° to 170° F. At lower temperatures some of the materials become somewhat difficult to handle. At higher temperatures, the pleasing effects of the compositions may sometimes appear diminished.

SEALING

The opalescent-appearing color compositions of our invention can be encapsulated, if desired, by any convenient means, using transparent or translucent materials such as glass or plastics or the like, so long as such are inert to the solvents and materials employed in the compositions of our invention. Solid, colored, opaque, or translucent backgrounds can be employed. Tubular display effects can be arranged, employing a light source at one or either end, for pleasing designs. Operative lights can be inserted in the encapsulation for on-and-off effects. Sealants of any suitable type can be employed to seal the encapsulation, or the entire encapsulation can be sealed in glass, plastic, or the like, so long as the materials employed are inert to the materials utilized in making our opalescent compositions.

EXAMPLES

The examples presented further illustrate and elucidate the extent and scope of our invention. Particular materials employed, species, ratios, and the like, should not be limitative of our invention, but should be considered to be illustrative thereof, so that appropriate scope can be returned to us in the way of claims as the fruit of our labors.

EXAMPLE I

A styrene/butadiene 90/10 copolymer was prepared by anionic solution polymerization employing a butyllithium initiator. The reaction was terminated with 0.2 part of methanol per 100 parts of polymer. The copolymer had a molecular weight in excess of 500,000 as determined by the amount of initiator used. The styrene/butadiene copolymer was dispersed to the extent of 8 to 12 weight percent in dibutyl Carbitol as solvent together with 0.1 to 2 weight percent of a photo stabilizer.

The compositions exhibited striking simulated precious opal appearance. The compositions were stable, even at prolonged heating at 200° F. The gel-like solutions were allowed to stand for several months with no significant evaporation, and, most importantly, no significant change in the striking appearance of the composition. Thus, such materials can be prepared and employed over long time intervals apparently without deterioration.

EXAMPLE II

Butadiene and styrene were polymerized using the following recipe and experimental conditions:

|  | Parts, by Weight |
| --- | --- |
| Butadiene | 10 |
| Styrene | 90 |
| Cyclohexane | 800 |
| n-Butyllithium | 0.01 |
| Time, hours | 0.7 |
| Temperature, °F. | 165–195 (adiabatic) |
| Conversion, % | 100 |

The polymerization was carried out under anhydrous conditions and with a positive nitrogen pressure. Dry cyclohexane, 96 pounds, was charged to the reactor, followed by 1.2 pounds of dry butadiene, and 10.8 pounds of dry styrene. The contents were heated to 165° F. with stirring and 0.0012 pounds of n-butyllithium in 0.024 pounds of cyclohexane was pressured into the reactor to initiate polymerization. The temperature of the mixture increased to 198° F. after 10 minutes, thereafter slowly decreasing. After 42 minutes the polymerization was terminated by the addition of 0.12 pounds of a fatty acid in cyclohexane. Conversion, measured by evaporating an aliquot of the reaction mixture to dryness at 250° F., was 100 percent. The polymer solution was stabilized by addition of 0.12 pounds of a commercial antioxidant butylated hydroxy toluene. The molecular weight of the polymer was calculated as follows:

$$M = \frac{\text{weight of monomer polymerized}}{\text{moles initiator}} = \frac{12}{\frac{.0012}{65}} = 650,000.$$

The polymer had an inherent viscosity of 1.85 and was gel-free.

The 90/10 styrene/butadiene copolymer was coagulated by pouring one volume of the cyclohexane solution into 5 volumes of isopropanol with stirring, and filtering to remove the copolymer. The copolymer was dried for 15 hours in a vacuum oven at 80° C. It was a hard white granular solid after drying.

An opalescent composition was prepared from the 90/10 styrene/butadiene copolymer. A mixture of 10 grams copolymer, 100 grams dibutyl carbitol, and 0.1 gram of a substituted hydroxyphenyl benzotriazole (Tinuvin 327 from Geigy Chemical Company, Ardsley, New York) were heated with stirring at about 65° C. for several hours until the copolymer had dissolved. Some colors were evident during the preparation of the solution. The solution cooled to room temperature and allowed to stand for a few hours. The entire solution appeared to be composed of patches of brilliant red, green, and blue opalescent colors, similar to precious opal.

A portion of the opalescent solution from Example II was heated to 90° C. for 6 hours and cooled to room temperature. The opalescent color disappeared when the solution was hot, but returned when the solution was cooled to room temperature and was equally as intense as the effect in a portion of the copolymer solution which had not been heated.

EXAMPLE III

A portion of the opalescent solution from Example II containing 1 gram of the 90/10 styrene/butadiene copolymer was heated to about 65° C. to increase fluidity and facilitate stirring, and then 0.005 g of channel black was added with stirring until uniformly dispersed. When the solution was cooled to room temperature and allowed to stand for a few hours, intense red and green colors developed against a clear blue-black background, resembling precious black opal.

EXAMPLE IV

An opalescent solution composition similar to that of Example II was prepared except that the benzotriazole stabilizer was omitted. A small sample of the unstabilized solution was placed in a stoppered glass vial, and a sample of the stabilized composition of Example II was placed in another stoppered glass vial for comparison. Each solution displayed brilliant opalescent coloration initially. Each was exposed to sunlight for 6 weeks. After 2 weeks the unstabilized solution which had become milky-opaque and lost the opalescent color effect; whereas, the stabilized sample retained strong opalescent effects even after 6 weeks.

EXAMPLE V

A portion of the 90/10 styrene-butadiene copolymer of Example II was dissolved sufficient to make a 10 weight per cent concentration of copolymer in amyl acetate, in hexyl acetate, in heptyl acetate, and in octyl acetate. Each solution displayed characteristic opalescent coloration at room temperature.

EXAMPLE VI

A styrene/butadiene 90/10 copolymer was prepared with 10 percent butadiene terminal groups, a molecular weight between 500,000 and 1,000,000. Portions were dissolved to the extent of 8 to 12 weight percent in octyl acetate, heptyl acetate, hexyl acetate, hexyl methacrylate, amyl acetate, methyl salicylate, methyl methacrylate, dibutyl phthalate 40/cc-terpineol 60, cyclohexane 70/toluene 30, and amyl acetate 90/xylene 10. Each gave good color play at room temperature.

EXAMPLE VII

A 90/10 styrene/butadiene copolymer was prepared similarly as described in Example II. The polymerization was initiated at 162° F. and peaked at 198° F. The polymerization was shortstopped after 0.6 hour by addition of 1 part of fatty acid and 1 part of butylated hydroxy toluene for each 100 parts of polymer. The polymer was coagulated with isopropanol and dried under vacuum. The inherent viscosity of the copolymer as measured in toluene was about 2.52. The copolymer was gel-free.

Solutions containing 5, 8, 10, 15, 20, and 25 weight percent of the copolymer in dibutyl carbitol were prepared. The 5 percent solution displayed faint opalescence. The solutions made to contain 8, 10, 15 and 20 weight per cent of the copolymer displayed brilliant opalescent colors, ranging from bright reds and orange to greens and blues. The sample made to contain 25 percent solids swelled, absorbing the solvent, and became viscous and jelly-like, and difficult to stir. Air bubbles which became entrapped during preparation were extremely difficult to remove. A portion of 8, 10, 15 and 20 percent solutions was warmed to increase fluidity and then poured into small hemispherical glass containers. After the solutions had cooled to room temperature, the exposed surface of the polymer solution was sealed with a layer of silicone rubber and allowed to stand overnight to permit the rubber to set up. The small glass hemispheres prepared in this manner closely resembled precious opal.

As can be realized from our description above, our compositions have wide effects as to color and opalescent effects, and at the same time have a wide potential utility in vases, trophies, plaques, table tops, counter tops, paper weights, as well as general utility in the ornamental jewelry field, pleasing light fixtures, house numbers, and the like.

Certainly, reasonable variations and modifications are possible within the scope of our disclosure, without departing from the scope and spirit thereof.

What is claimed is:

1. Opalescent-appearing compositions comprising a solvent-dispersant and a block copolymer enclosed by encapsulating means wherein at least a portion of said encapsulating means is optically transparent or translucent, wherein said block copolymer consists essentially of a copolymerized monovinyl-substituted aromatic compound and a copolymerized conjugated diene, wherein said monovinyl-substituted aromatic compound comprises at least about 75 weight percent of said block copolymer, wherein in said solvent-dispersant and block copolymer composition, said block copolymer represents about 5 to 25 weight percent based on total weight of said solvent-dispersant and said block copolymer, wherein said solvent-dispersant contains 5 to 16 carbon atoms per molecule and is selected from the group consisting of normally liquid esters, mono- or dialkyl ethers of dipropylene or diethylene glycol, higher alcohols, admixture of any of these, or optionally in admixture with aromatic hydrocarbons, and wherein said block copolymer is further characterized as a terminated block copolymer with a molecular weight of at least about 500,000 prepared by the anionic solution polymerization of said monovinyl-substituted aromatic compound and of said conjugated diene employing a lithium-based initiator consisting essentially of a hydrocarbon lithium initiator, and wherein said solvent-dispersant contains one or more components from said group of amounts and ratios sufficient to effect opalescent appearance in said composition.

2. The composition according to claim 1 further comprising 0.01 to 0.5 weight percent carbon black.

3. The composition according to claim 1 wherein said monovinyl-substituted aromatic compound contains up to 20 carbon atoms per molecule, said conjugated diene contains up to 10 carbon atoms per molecule, and said composition comprises about 5 to 25 weight percent of said copolymer and correspondingly about 95 to 75 weight percent of said solvent-dispersant.

4. The composition according to claim 3 wherein said composition contains about 5 to 20 weight percent of said copolymer and 95 to 80 weight percent of said solvent-dispersant.

5. The composition according to claim 3 wherein said monovinyl-substituted aromatic compound contains up to 12 carbon atoms per molecule, said conjugated diene up to 6 carbon atoms per molecule, said copolymer contains 75 to 95 weight percent of copolymerized monovinyl-substituted aromatic compound and 25 to 5 weight percent of copolymerized conjugated diene; and said molecular weight ranges from about 500,000 to 1,000,000.

6. The composition according to claim 5 wherein said ester is represented by

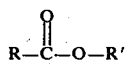

wherein R is hydrogen or cycloalkyl, alkyl, alkenyl, cycloalkenyl, or aryl radical of up to 8 carbon atoms per molecule, and R' is alkyl, cycloalkyl, alkenyl, cycloalkenyl, or aryl, containing up to 8 carbon atoms and said ester is liquid;
said ether is an ether of propylene or ethylene glycol of up to 16 carbon atoms per molecule; said alcohol contains up to 16 carbon atoms per molecule; and said hydrocarbon is an aromatic hydrocarbon of up to 12 carbon atoms per molecule.

7. The composition according to claim 6 wherein said solvent-dispersant is an ester, an ester/aromatic hydrocarbon admixture, a mono- or dialkyl ether of dipropylene or diethylene glycol, a mono- or dialkyl ether of dipropylene or diethylene glycol/ester admixture, or mono- or dialkyl ether of dipropylene or diethylene glycol/aromatic hydrocarbon admixture.

8. The composition according to claim 7 wherein said monovinyl-substituted aromatic compound is styrene, and said conjugated diene is butadiene.

9. The composition according to claim 8 wherein said copolymer is 90/10 styrene/butadiene copolymer.

10. The composition according to claim 9 wherein said solvent-dispersant is diethylene glycol dibutyl ether, amyl acetate, hexyl acetate, heptyl acetate, octyl acetate, or mixture.

11. The composition according to claim 9 wherein said solvent-dispersant is dibutyl phthalate/α-terpineol, or amyl acetate/xylene.

12. A process of preparing an encapsulated opalescent composition which comprises the steps of dispersing a block copolymer in a solvent-dispersant system and enclosing the resulting dispersion with encapsulating means wherein at least a portion of said encapsulating means is optically transparent or translucent, said dispersion comprising about 5–25 weight percent of said block copolymer relative to the total of copolymer and solvent-dispersant,
wherein said block copolymer consists essentially of about 75 to 95 weight percent of copolymerized monovinyl-substituted aromatic compound and correspondingly about 25 to 5 weight percent of copolymerized conjugated diene, the molecular weight of said block copolymer is at least about 500,000, said block copolymer further is characterized as a product of anionic solution polymerization of said monovinyl-substituted aromatic compound and said conjugated diene with a lithium-based catalyst consisting essentially of a hydrocarbon lithium initiator, followed by termination, and
wherein said solvent-dispersant is a monosolvent or polysolvent and is selected from the group consisting of:
a. a normally liquid ester represented by the formula

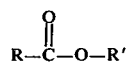

wherein R is hydrogen or cycloalkyl, alkyl, alkenyl, cycloalkenyl, or aryl radical of up to 8 carbon atoms per molecule, R' is alkyl, cycloalkyl, alkenyl, cycloalkenyl, or aryl, containing up to 8 carbon atoms, such that said normally liquid ester contains at least 5 carbon atoms per molecule;
b. mono- or dialkyl ether of dipropylene or diethylene glycol of up to 16 carbon atoms per molecule;
c. alcohol of 5 to 16 carbon atoms per molecule;
d. admixture of any two or more of (a), (b), and (c); and
e. admixture of any of the above with aromatic hydrocarbon of up to 12 carbon atoms per molecule.

13. The process of claim 12 further incorporating from about 0.01 to 0.5 weight percent of carbon black.

14. The process according to claim 13 wherein said copolymer is a styrene/butadiene block copolymer.

15. The process according to claim 14 wherein said block copolymer is a 90/10 styrene/butadiene block copolymer, and said solvent-dispersant is diethylene glycol dibutyl ether, octyl acetate, heptyl acetate, hexyl acetate, hexyl methacrylate, amyl acetate, methyl salicylate, methyl methacrylate, dibutyl phthalate/α-terpineol, or amyl acetate/xylene.

16. Decorative jewelry prepared by the process of claim 12.

17. Decorative jewelry prepared by the process of claim 13.

* * * * *